Oct. 6, 1931. J. E. WILSON ET AL 1,826,537
APPARATUS FOR MECHANICALLY HANDLING DOUGH DURING PROVING
Filed June 27, 1930 2 Sheets-Sheet 1
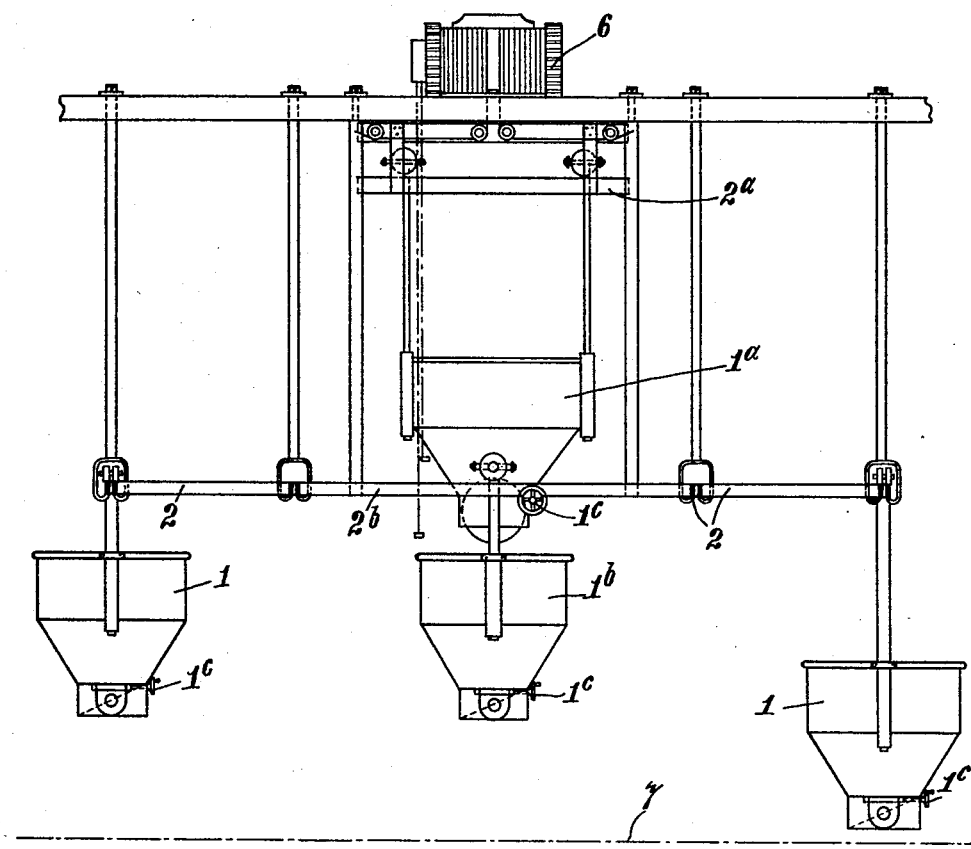

Oct. 6, 1931.    J. E. WILSON ET AL    1,826,537
APPARATUS FOR MECHANICALLY HANDLING DOUGH DURING PROVING
Filed June 27, 1930    2 Sheets-Sheet 2
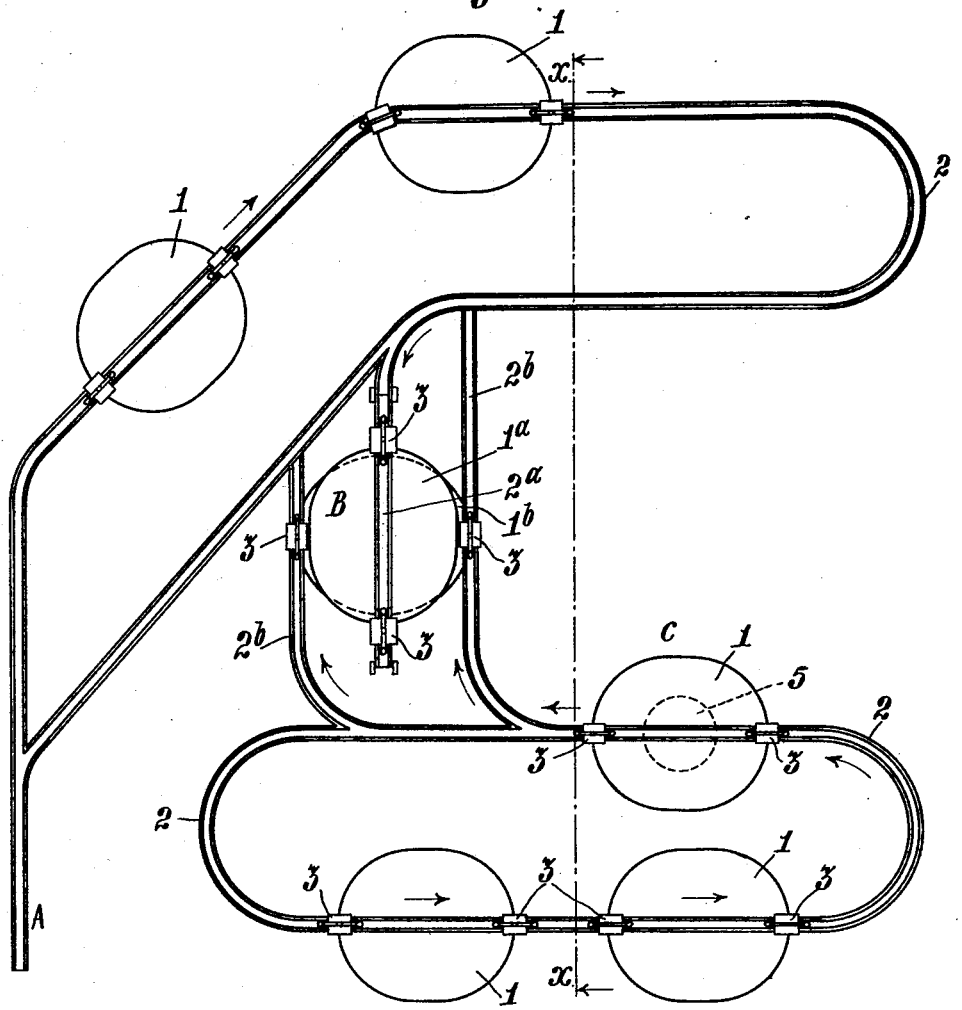

Patented Oct. 6, 1931

1,826,537

UNITED STATES PATENT OFFICE

JAMES ELLIOTT WILSON, SAMUEL McCONNELL, AND CAMPBELL BROWN, OF BELFAST, IRELAND

APPARATUS FOR MECHANICALLY HANDLING DOUGH DURING PROVING

Application filed June 27, 1930, Serial No. 464,204, and in Great Britain September 10, 1929.

In bread making, the dough is taken from the mixer or kneader into each of a number of separate receptacles or kneaded in movable receptacles in which the dough is proved, the receptacles being removable to a position to receive (or knead) the dough and, during proving, to a position at which the dough is discharged to a divider or weighing machine. It is usual to take the dough from one proving receptacle to another to effect what is known in the trade as "cutting back". These receptacles are usually mounted on wheels which run along the floor of the bakery, causing very great wear and tear on the floor and heavy upkeep costs, and the dough has also to be taken by hand from one receptacle to another during the "cutting back" operation. This invention has for its object the elimination of human handling and to provide further automatic, more hygienic and efficient means for carrying out the known process and practice of bread (and the like) manufacture.

According to this invention, the dough proving receptacles are supported from overhead rails or runways, of any suitable construction and are carried by one or more trolleys running on said rails or runways, which latter are arranged at a suitable height above the floor so that the dough receptacles can be carried along clear of the floor, the dough receptacles being, preferably, each so made that they can be discharged through the bottom thereof. The runways or rails are so shaped and arranged as to carry the dough proving receptacles from the point where they are filled to a suitable position for discharging their contents either into another receptacle, as hereinbefore described, or into a discharge hole or chute in the floor, leading to the measuring or weighing machine and (or) divider. For the purpose of providing for "cutting back" of the dough by discharging same from one receptacle into another receptacle, means are provided for raising either a section of the rail and receptacle, or the receptacle itself, by suitable lifting gear so as to raise said portion of the rail and (or) receptacle to a height sufficient to permit of another receptacle from another portion of the runway to be brought into position, on rails or runways, below the raised receptacle, whereby the contents of the latter can be discharged into the receptacle below, thereby cutting back the dough from one receptacle to another. The receptacle to which the dough has been delivered from another receptacle, as described, is then moved back, or otherwise moved, clear of the raised receptacle, which can be lowered to normal position again, the rail, if raised, being brought back to its normal plane so that the empty receptacle thereon can be run back on to the fixed runway rails and moved again to the filling position. Meanwhile the receptacle which has been filled with the "cut back" dough, is moved along the runway system, being taken round same as long as desired and then to the position for emptying into the hole or chute in the floor leading to the dough measuring or weighing device and (or) divider.

The arrangement of the fixed runway rails above the floor may be as desired to give the required length of time between the filling of a receptacle and its final discharge. The time of proving can, of course, also be regulated by the speed at which the receptacles are moved along the rails. They can also, if necessary, be left stationary for any desired length of time.

The invention will now be described with reference to the accompanying drawings, which show an arrangement for a moderate sized bakery and is given only by way of example.

Fig. 1 is a sectional elevation on line xx, Fig. 2, of a portion of a runway system, showing the lifting rail and receptacles in different positions.

Fig. 2 is a plan view of a complete runway system for a moderate sized bakery and showing the receptacles in different positions on the runway.

Referring to the drawings:—

According to the example shown, the dough proving receptacles 1 are supported from overhead rails or runways 2, of any suitable construction and each carried by two trolleys 3 pivotally attached to the receptacles and running on the rails or runways 2 which are arranged at a suitable height above the floor so that the dough receptacles 1 are carried along clear of the floor. The dough receptacles 1 are made with bottom openings controlled by valves 1c so that they are discharged through the bottom. The runways or rails 2 are so shaped and arranged as to carry the dough proving receptacles from the point A where they can be filled from a mixer (not shown) to a suitable position B for discharging their contents either into another receptacle, and after a predetermined time therein into a discharge hole or chute 5 in the floor at C which leads to a measuring or weighing machine and (or) divider (not shown).

For the purpose of providing for "cutting back" of the dough by discharging same from one receptacle into another receptacle, means are, in the example shown, provided for raising a section 2a of the rail and receptacle thereon. For this purpose suitable lifting gear 6 is provided so as to raise said portion of the rail 2a and receptacle 1a thereon to a height sufficient to permit of another receptacle 1b from another portion of the runway 2 to be brought into position, on the rails or runways 2b below the raised receptacle, whereby the contents of the latter can be discharged into the receptacle below, thereby cutting back the dough from one receptacle to another. It will be observed that we provide two rails or runways 2b one on each side of the lifting rail 2a, for carrying the receptacle 1b below the raised receptacle 1a, the under receptacle 1b being therefore carried below the raised receptacle 1a on two runways 2b instead of on a single runway as employed throughout the rest of the runway system. This arrangement allows of the lifting rail 2a and the receptacle 1a carried thereby, being lifted up clear of the runways 2b which carry the receptacle 1b which has to be brought underneath the raised receptacle 1a. The receptacle to which the dough has been delivered from another receptacle, as described, is then moved back, or otherwise moved clear of the raised receptacle which can be lowered to normal position again, the rail being brought back to its normal plane so that the empty receptacle thereon can be run back on to the fixed runway rails 2 and moved again to the filling position at A. Meanwhile the receptacle which has been filled with the "cut back" dough, is moved along the runway system, being taken round same as long as desired and then to the position for emptying into the hole or chute in the floor leading to the dough measuring or weighing device and (or) divider.

The rail levels would be such that the bottom of the underneath receptacles 1b would be at a height above the floor 7 sufficient to enable the operator conveniently to control the valve 1c which regulates the discharge of the dough from the receptacle at the point C where it is emptied through the hole in the floor or chute leading to the measuring device and (or) divider. The receptacles on the other part or primary part of the system may have their bottoms just clear of the floor 7 as, of course, they will be raised up on the lifting rail before being discharged.

Whilst the arrangement described is intended for operation between floor and ceiling on one floor level, alternatively one series of receptacles may be on one floor and the second, or other series, on a lower floor or level.

We claim:—

1. Apparatus for mechanically handling dough during the proving thereof in a bakery, comprising, in combination, a number of receptacles in which the dough is placed, a railway elevated with respect to the floor of the bakery, means whereby said receptacles can be run on said railway so as to be moved along clear of said floor, a number of secondary receptacles, rails on which said secondary receptacles in turn can be run below a corresponding primary receptacle, and means for releasing the dough from said primary receptacle into said secondary receptacle.

2. Apparatus for mechanically handling dough during the proving thereof in a bakery, comprising, in combination, a number of primary receptacles in which the dough is placed, a number of secondary receptacles, rail means elevated with respect to the floor of the bakery, wheeled supports adapted to run on said rail means and to support said primary receptacles so that they are movable on said rail means clear of said floor, a branch railway whereon said primary receptacles are movable from said rail means one at a time, secondary rail means elevated with respect to the floor of the bakery, secondary wheeled supports adapted to run on said rail means and to support said secondary receptacles so that they are movable on said secondary rail means clear of the floor, a second branch railway whereon said secondary receptacles are movable one at a time, means for raising and lowering said first mentioned branch railway relatively to said second branch railway, and means for dropping dough from each primary receptacle when raised into a secondary receptacle on said second branch railway.

3. Apparatus for mechanically handling dough during the proving thereof in a bakery, comprising, in combination, a number of receptacles in which the dough is placed, rail means on which said receptacles are laterally movable clear of the floor of the bakery, means for raising each receptacle in turn above its normal level, secondary receiving means at a level below the first mentioned receptacles when raised, and means for dropping the dough from said first mentioned receptacles when raised into the secondary receiving means.

4. Apparatus for mechanically handling dough during the proving thereof in a bakery, comprising, in combination, a number of primary receptacles for the dough, a railway elevated with respect to the floor of the bakery, wheeled supports for suspending said receptacles from said railway, a number of secondary receptacles, a railway for said secondary receptacles elevated with respect to said floor, wheeled supports connecting said secondary receptacles and railway, and means for raising said primary receptacles, and means whereon a secondary receptacle can be moved so that it lies below a primary receptacle, and means for dropping the dough from the primary receptacle into the secondary receptacle.

5. Apparatus for mechanically handling dough during the proving thereof in a bakery, comprising, in combination, a number of receptacles for the dough, a railway elevated with respect to the floor of the bakery, wheeled supports whereby said receptacles are suspended from said railway clear of the floor, a branch rail on which said receptacles can be accommodated one at a time, means for lifting and lowering said branch rail, means for opening and closing the bottom of said receptacles, and secondary receiving means adapted to be located below said vertically movable branch rail.

6. Apparatus for mechanically handling dough during the proving thereof in a bakery, comprising, in combination, a number of primary receptacles, a railway adapted to support said receptacles clear of the floor of the bakery, means for opening and closing the bottom of each receptacle at will, a number of secondary receptacles, a railway for supporting said secondary receptacles clear of said floor, means whereby the primary receptacles can be raised one at a time, means whereby said secondary receptacles can be moved one at a time to a position below the raised primary receptacle, a chute located below the level of said secondary receptacles, and means for opening and closing the bottom of said secondary receptacle at will so as to discharge the proved dough through said chute.

In testimony whereof we affix our signatures.

JAMES ELLIOTT WILSON.
SAMUEL McCONNELL.
CAMPBELL BROWN.